(12) United States Patent
Harvey et al.

(10) Patent No.: US 6,189,039 B1
(45) Date of Patent: *Feb. 13, 2001

(54) SELECTIVE TUNNELING OF STREAMING DATA

(75) Inventors: John Paul Harvey, Round Rock; Mark Scott Kressin; Richard Allen Mills, both of Austin, all of TX (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/827,741

(22) Filed: Apr. 10, 1997

(51) Int. Cl.[7] .................................................. G06F 13/00
(52) U.S. Cl. ........................................... 709/232; 709/231
(58) Field of Search ............................ 395/200.6, 200.61, 395/200.33; 709/230, 231, 203, 232

(56) References Cited

U.S. PATENT DOCUMENTS

| | | | |
|---|---|---|---|
| 5,331,637 | 7/1994 | Francis et al. | 370/408 |
| 5,361,256 | 11/1994 | Doeringer et al. | 370/390 |
| 5,459,725 | * 10/1995 | Bodner et al. | 370/390 |
| 5,517,494 | 5/1996 | Green | 370/408 |
| 5,519,704 | 5/1996 | Farinacci et al. | 370/402 |
| 5,530,703 | 6/1996 | Liu et al. | 370/255 |
| 5,577,035 | 11/1996 | Hayter et al. | 370/395 |
| 5,600,795 | 2/1997 | Du | 709/227 |
| 5,608,726 | 3/1997 | Virgile | 370/401 |
| 5,740,374 | * 4/1998 | Raffali-Schreinemachers | 709/238 |
| 5,778,187 | * 7/1998 | Monteiro et al. | 709/231 |
| 5,854,898 | * 12/1998 | Riddle | 709/231 |
| 5,983,005 | * 11/1999 | Monteiro et al. | 709/231 |
| 6,006,267 | * 12/1999 | Nguyen et al. | 709/227 |
| 6,041,166 | * 3/2000 | Hart et al. | 709/238 |

FOREIGN PATENT DOCUMENTS

WO 97/04386  2/1997  (WO).

OTHER PUBLICATIONS

G. Xylomenos et al.; IP Multicasting for Point-to-Point Local Distribution; IEEE Proceedings of INFOCOM' Apr. 1997, Driving the Information Revolution; pp. 1380–1387.*

* cited by examiner

Primary Examiner—Kenneth R. Coulter
(74) Attorney, Agent, or Firm—David H. Judson; Volel Emile

(57) ABSTRACT

A method and system for "selective" tunneling of streaming data from a server to a client in a computer network having one or more network segments. The server has a tunneler utility, and the client has a receiver utility. The receiver utility first attempts to detect if a given data stream is available via IP multicast on the network segment supporting the client. If not, then the receiver utility issues a request for a IP unicast stream. This request is serviced by the tunneler utility. The tunneler utility re-broadcasts the IP multicast feed using IP unicast to send the data stream directly to the requesting user and/or to a repeater utility. The receiver utility then receives and processes the data stream for output to the end user. Alternatively, the receiver application, or a network administrator, launches the repeater utility, which then converts the IP unicast stream back to IP multicast format for re-broadcast over the network segment to other clients.

11 Claims, 3 Drawing Sheets

SELECTIVE TUNNELING OF STREAMING DATA

BACKGROUND OF THE INVENTION

1. Technical Field

The present invention generally relates to data transmissions in computer networks and, in particular, to a method for selective streaming of data (e.g. video) using multiple transmission protocols.

2. Description of the Related Art

It is known in the prior art to "stream" data between different segments of a computer network. In a typical computer network environment, such as an enterprise intranet, data streaming may be carried out by delivering a separate stream for each user or by delivering a single stream to all users. The former technique effects point-to-point (P2P) communication or "unicasting" and is often implemented using the Internet Protocol (IP) unicast communications protocol. The latter technique effects point-to-multipoint (P2M) communication or "multicasting" and is often implemented using the IP multicast communications protocol. IP multicast is the most efficient of these transport mechanisms because only one copy of the data is propagated throughout the network. All systems that desire to receive the transmitted stream simply register with the network to receive the data.

Although IP multicast is the most desirable method of transmitting the data to several systems at once, it is sometimes not used. IP multicast may not be used due to technical limitations. For example, some network routers may not have the capability to support the protocol; alternatively, the available network bandwidth on some segments of the network may not have the capacity to handle streaming data traffic when it is not received by any end user on the segment. Even where the network segment may support IP multicast, a network administrator may elect not to activate it for performance reasons as multicasting does consume bandwidth. For these reasons, IP multicast is most commonly used in a highly-selective manner throughout the network.

It is also known in the art to use both IP multicast and IP unicast on the same intranet to transmit the same data. However, such techniques have a number of problems associated with them as well. First, a careful mix of IP multicast and IP unicast must be established that minimizes the amount of data being transmitted on the network. For example, if some users receive the data via IP multicast and others receive it via IP unicast, multiple copies of the data are transported out onto the network. This may or may not be the most efficient way to reach these systems, especially if many of the unicast streams are directed to systems on the same network segment. Another problem that arises from the combination of IP multicast and IP unicast on the same intranet is that the receiving application must be capable of handling both types of streams while minimizing the network traffic requirements.

The present invention is directed to solving these problems.

SUMMARY OF THE INVENTION

It is a primary object of this invention to minimize network traffic in a computer network by providing an efficient data streaming method.

It is another object of this invention to enhance the efficiency of data transport over a computer network using known unicasting and multicasting techniques.

It is still another object of this invention to use IP unicast and IP multicast protocols to stream the same data to multiple users in a computer network in a manner that minimizes network traffic.

It is yet another more general object of this invention to provide selective streaming of video data from a video server to end users in a computer network such as an enterprise intranet.

It is still another object of the invention to enhance bandwidth utilization in a computer network transparently to the end user.

Another general object of this invention is to enhance the transmission of video data streams across multiple segments of a computer network.

These and other objects of the invention are achieved through a technique of "selective" tunneling of streaming data from a server to a client in a computer network having one or more network "segments." Thus, for example, a computer network is an enterprise intranet having a plurality of local area network segments. The server has a tunneler utility, and the client has a receiver utility. A repeater utility may also be running in each network segment. Typically, the tunneler utility receives an IP multicast signal and converts the signal to IP unicast format for delivery to an end user. According to the invention, the receiver utility running on the client machine first attempts to detect if a given data stream is available via IP multicast on the network segment supporting the client. If not, then the receiver utility issues a request for an IP unicast stream. This request is serviced by the tunneler utility. The tunneler utility re-broadcasts the IP multicast feed using IP unicast to send the data stream directly to the requesting user and/or to a repeater utility. The receiver utility then receives and processes the data stream for output to the end user. Alternatively, the receiver application, or a network administrator, launches the repeater utility, which then converts the IP unicast stream back to IP multicast format for re-broadcast over the network segment, so that other clients on the segment may receive it.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
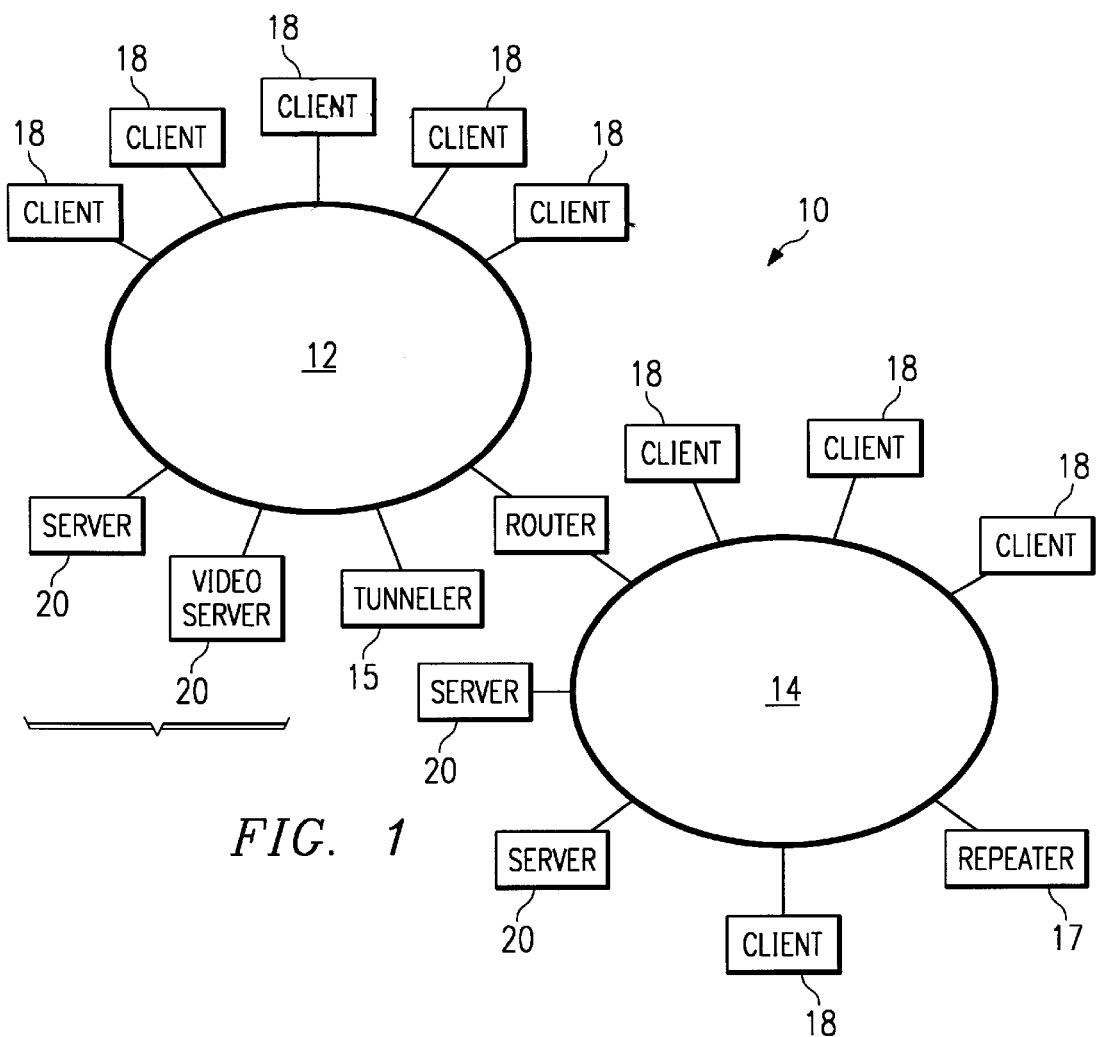
FIG. 1 is a simplified block diagram of a computer network in which the present invention is implemented.

A computer network in which the present invention is implemented is illustrated in FIG. 1. For illustrative purposes, the computer network is an enterprise intranet, although it should be appreciated that the invention may be implemented in any computer network comprising one or more "network segments." A "network segment" is a given or defined portion of the network over which data in a particular format may be transported without modification Intranet 10 comprises two network segments 12 and 14. Each of the segments 12 and 14 is represented as a local area network (LAN) configured as a ring, and the two segments are interconnected in a known manner, e.g., by a bridge or router 16. Segment 12 includes a plurality of client machines 18 and one or more servers 20. Segment 14 likewise includes a plurality of client machines 22 and one or more servers 24. One or both segments may be connected to other networks, e.g., the Internet.

One of the servers generates data, such as video content, that is desired to be received and viewed at one or more clients. To this end, it is known in the prior art to provide a so-called "tunneler" utility and, if needed, a "repeater" utility. For illustrative purposes, each of the network segments may be assumed to have its own tunneler 15 and one or more repeaters 17. Typically, a server has a tunneler associated therewith. The tunneler utility, which is shown as a separate entity but typically runs on a server as a dedicated process, receives an IP multicast signal and converts the signal to IP unicast format for delivery to an end user. The repeater utility likewise is shown as a separate entity but typically runs on a client or server as a dedicated process. It functions to receive an IP unicast signal and convert the signal to IP multicast format for delivery to other end users. According to the invention, the known tunneling utility is "enhanced" and, in conjunction with a "smart" receiver application, together provide improved traffic management for data streaming applications.

Each of the client and server machines comprise a computer. Thus, for example, a representative client machine is a personal computer such as a desktop of notebook computer, e.g., an IBM® or IBM-compatible machine running under the OS/2® operating system, an IBM ThinkPad® machine, or some other Intel x86 or Pentium®-based computer running Windows 3.1 or greater operating system. A client machine typically includes a suite of known Internet tools to access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML).

A representative server platform comprises an IBM RS/6000 computer (a reduced instruction set of so-called RISC-based workstation) running the AIX (Advanced Interactive Executive Version 4.1 and above) Operating System and various server program(s). The various models of the RISC-based computers are described in many publications of the IBM Corporation, for example, RISC System/6000, 7013 and 7016 POWERstation and POWERserver Hardware Technical Reference, Order NO. SA23-2644-00. AIX OS is described in AIX Operating System Technical Reference, published by IBM Corporation, First Edition (November 1985), and other publications. While the above platform is useful, any other suitable hardware/operating system/server combinations may be used.

Figure 2:
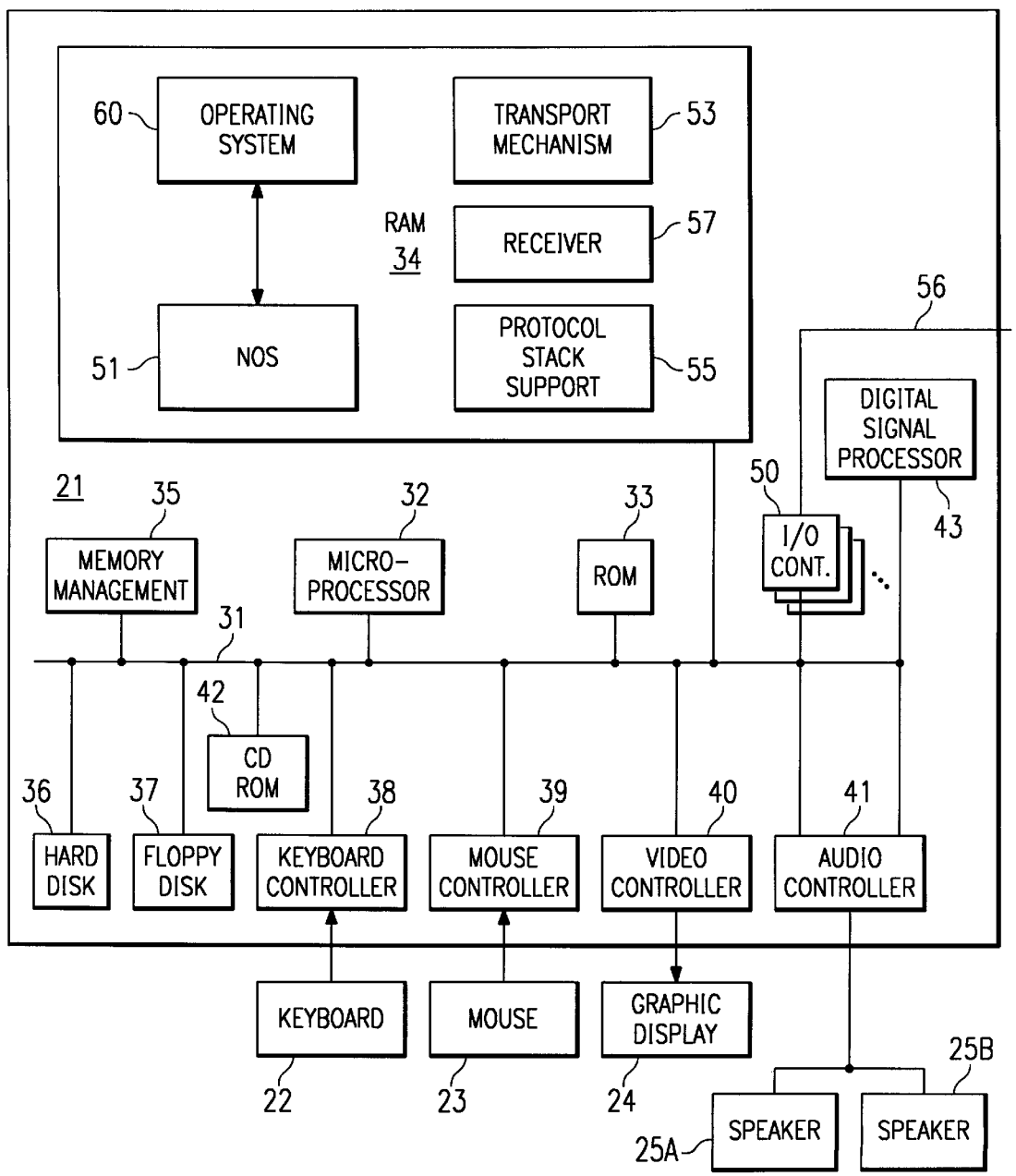
FIG. 2 is a block diagram of a computer used as a client or server in the computer network of FIG. 1.

Referring now to FIG. 2, a simplified block diagram is shown of a portion of a computer in which the present invention is implemented. This computer represents a "client" machine in the network, although the architecture applies equally well to a server. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the Intel family including the Pentium may be used. Other microprocessors including, but not limited to, Motorola's family of microprocessors such as the 68000, 68020, or the 68030 microprocessors and various RISC microprocessors manufactured by IBM, Hewlett Packard, Sun, Intel, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system (OS) 60 and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 34, and the audio controller 41 is the hardware interface for the speakers 2a and 25b. One or more I/O controllers 50, such as a Token Ring Adapter, and Ethernet Adapter, a PC-Net Adapter, and so on, enables communications over the network 56 to other similarly configured data processing systems.

RAM 34 also supports a Network Operating System (NOS) 51 and an associated transport mechanism 53 which together control LAN communications. A protocol stack support routine 55 is also supported for enhancing the number of server sessions that may be supported by the machine, as will be described in more detail below. According to the invention, the RAM 34 also supports a receiver utility 57 to facilitate "selective" tunneling of data to the client as will now be described.

Figure 3:
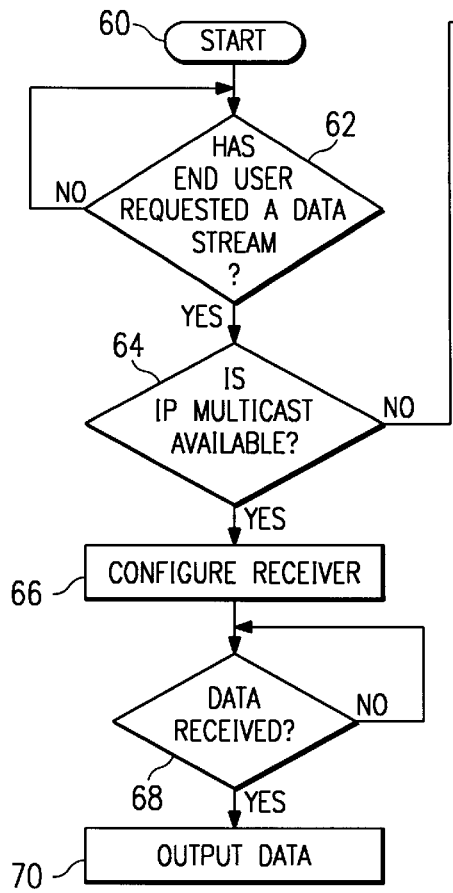
FIG. 3 is a flowchart illustrating the "selective" tunneling routine of the present invention.
Figure 3:
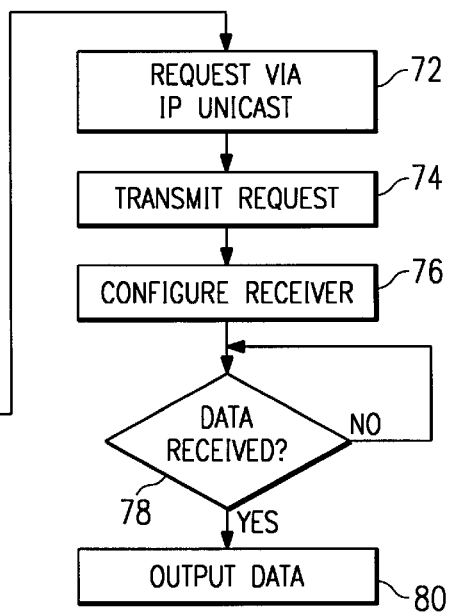

Referring now to FIG. 3, a flowchart is shown of a preferred operating routine of the receiver utility. In general, the receiver utility is responsive to a client request for a given data stream and determines whether or not the data stream is available for transport via IP multicast over the particular network segment on which the client is running. A data stream may not be available for transport via IP multicast for one or more reasons. Thus, with respect to the illustrative network of FIG. 1, the router 16 may not be capable of supporting the protocol. Alternatively, the router may have such capability, yet available network bandwidth of the segment may be insufficient. Still another possibility is that there are no technical limitations to IP multicast, yet the administrator may elect not to activate the protocol for use in the network segment due to network, administrative or performance constraints. According to the invention, if the receiver utility determines that the desired data stream is not available via IP multicast, it issues a request for transport of data via an alternate protocol, such as IP unicast. The receiver thus provides "smart" or intelligent streaming of data when the particular network segment either does not support or cannot access IP multicast. This "selective" control of data streaming provides significant advantages over the prior art as it enables the client machine (but not necessarily with the end user's knowledge or awareness) to facilitate bandwidth management on a per request basis. Once the data stream is received in the network segment, it may also be selectively re-broadcast to other clients as will be seen.

Turning to FIG. 3, the inventive receiver utility routine begins at block 60. At step 62, a test is made to determine whether or not an end user has requested a data stream. This may occur through an express request (if a given data stream is desired) or the step may represent that the data is merely being pushed to the client (e.g., according to a predetermined time schedule). If the result of the test at step 62 is negative, the routine cycles. If, however, the result of the test at step 62 indicates that data is to be streamed to the end user, the routine continues at step 64 to determine whether or not IP multicast capability is available within the particular network segment on which the client is running. As discussed above, there are several reasons why the particular network segment does or does not support IP multicast with respect to this particular client, end user or data request. Step 64 is illustrated as a single process but one of ordinary skill will appreciate that there may be several steps involved in this process.

If the outcome of the test at step 64 is positive, then the receiver is configured at step 66 to receive the IP multicast. Although not meant to be limiting, typically this involves opening an IP multicast socket connection, which is then broadcast over the network. At step 68, a test is performed to determine if the data stream has been received. If not, the routine cycles as shown. If, however, the IP multicast stream is being or has been received, the data is output to the end user at step 70. Of course, the data stream is also saved in the client in a conventional manner.

If, however, the result of the test at step 64 is negative, then the receiver must undertake some other method of obtaining the data stream which, for purposes of the invention, is assumed to be broadcast via IP multicast. Thus, at step 72, the receiver configures a request that the data stream be provided via an alternative protocol, such as IP unicast. The request includes an IP unicast address and port number associated with the receiver application. At step 74, this request is transmitted over the network, where it is picked up and serviced, typically by the tunneler associated with the server as previously described. At step 76, the receiver is configured to receive the IP unicast. Although not meant to be limiting, typically this involves opening an IP unicast socket connection. At step 78, a test is performed to determine if the data stream has been received. If not, the routine cycles as shown. If, however, the IP unicast stream is being or has been received, the data is output to the end user at step 80.

Figure 4:
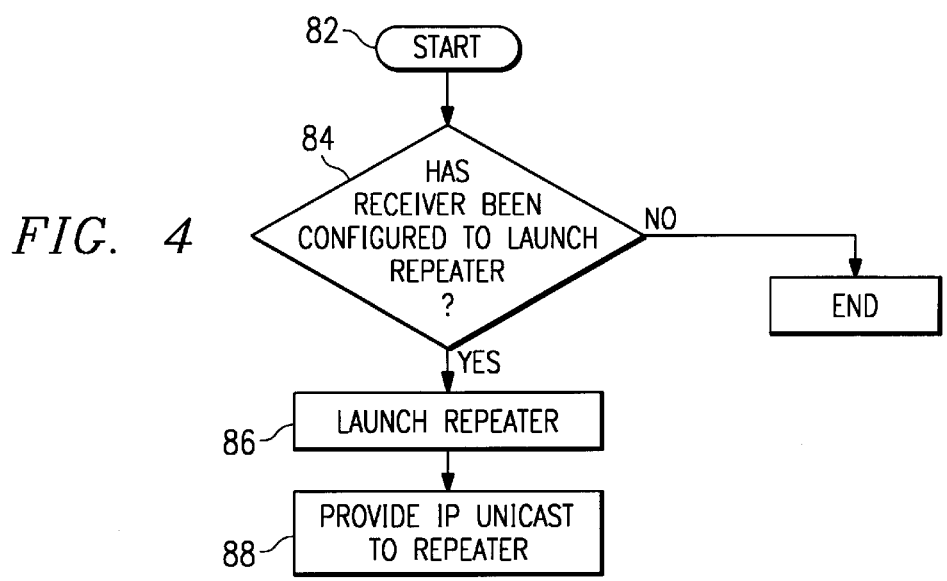
FIG. 4 is a flowchart illustrating how the receiver utility is used to launch a repeater utility according to an alternate feature of the invention.

According to the invention, the receiver application may launch a repeater utility to re-broadcast the IP unicast data stream to other end users in the network segment. Typically, the repeater utility is supported on a separate machine, but this utility may be running on the client as well. The additional processing provided by the receiver application in this regard is shown in FIG. 4. The routine begins at step 82. At step 84, a test is made to determine whether or not the receiver application has been configured to launch the repeater. If the outcome of the test at step 84 is negative, the routine terminates. If, however, the outcome of the test at step 84 is positive, the routine continues at step 86 to launch the repeater. As noted above, the repeater utility may or may not reside on the same physical machine. At step 88, the received IP unicast data stream is provided to the repeater utility in which it is converted to IP multicast format and then re-broadcast.

Alternatively, the repeater utility may be launched by a system administrator in the network. Thus, for example, an administrator may review network logs and, based on the information therein, make a determination whether or not to include in the IP multicast pool network segments that frequently request IP unicast streams. If so, the administrator then selectively configures and then launches the repeater utility in a known manner so that IP unicast streams are re-broadcast to one or more other clients that express a desire (via subscription or other means) for receipt of the data. The system administrator may periodically poll the clients for their subscription requests or otherwise post the "available" streams to identify which other clients may want to receive them.

Figure 6:
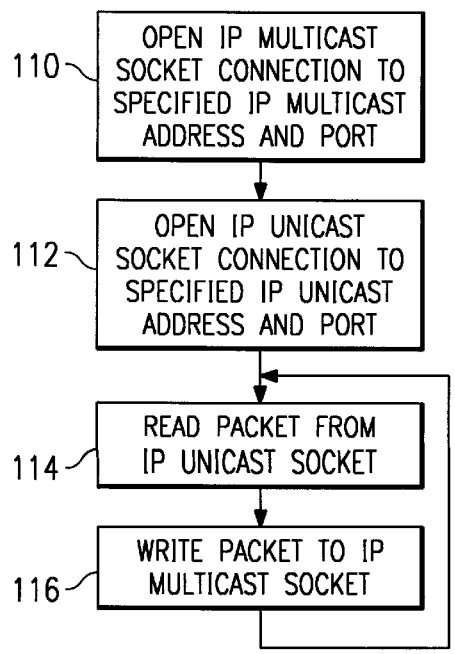
FIG. 6 is a flowchart illustrating the operation of the repeater utility of the present invention.
Figure 5:
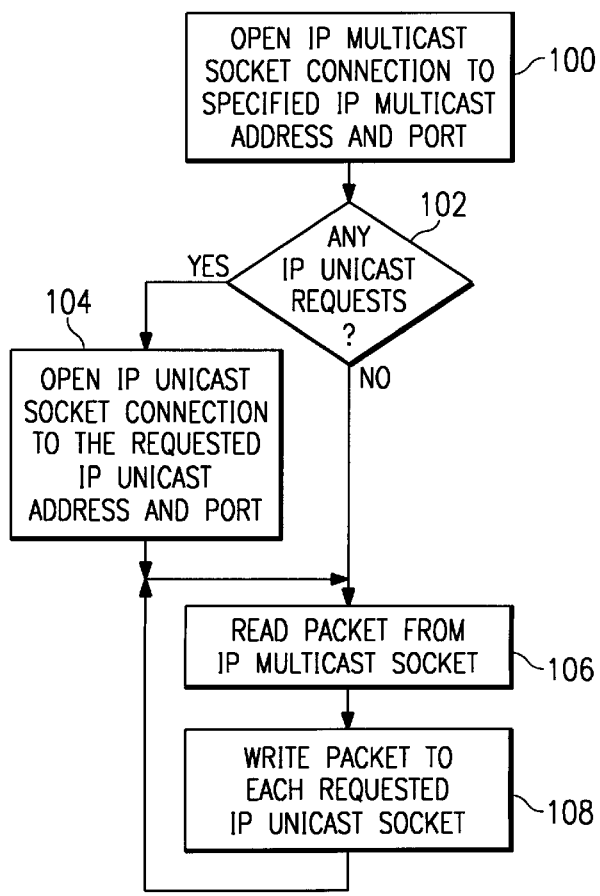
FIG. 5 is a flowchart illustrating the operation of the tunneler utility of the present invention.

The operation of the tunneler and repeater utilities is now described in the flowcharts of FIGS. 5 and 6, respectively. FIG. 5 illustrates the tunneler utility which, as noted above, may be associated with a server. At step 100, the tunneler opens an IP multicast socket connection to a specified IP multicast address and port number. The IP multicast address and port number identify a particular server feeding the tunneler with IP multicast data streams. At step 102, a test is made to determine whether the tunneler has received any IP unicast requests. An IP unicast request is one issued by the receiver application as described in step 74 of FIG. 3. As noted above, the unicast request identifies an IP unicast address and port number identifying the receiver application. Step 102 is a feature of the present invention that, together with the "smart" receiver application described in FIG. 3, facilitates selective tunneling of the data. If the outcome of the test at step 102 is positive, the tunneler utility continues at step 104 by opening up an IP unicast socket connection to the requested IP unicast address and port number. If the outcome of the test at step 102 is negative, or after step 104, the routine continues at step 106. There, the tunneler reads a packet from the IP multicast socket opened in step 100. At step 108, the tunneler utility writes the packet to the requested IP unicast socket opened at step 104. This reading and writing of packets is continued until the data stream is transmitted.

The repeater utility, which is illustrated in FIG. 6, assumes that the data has been streamed from the tunneler via IP unicast and needs to be re-broadcast to one or more other clients in the network segment. To this end, the repeater begins at step 110 by opening up an IP multicast socket connection to a specified IP multicast address and port (for each new client that will receive the data stream). At step 112, the repeater opens up the IP unicast socket connection to a specified IP unicast address and port number (typically, the receiver application that has received or is receiving the data stream). At step 114, the repeater utility reads a packet from the IP unicast socket and, at step 116, writes the packet to the IP multicast socket. Steps 114 and 116 are repeated until the data stream is fully converted.

The present invention provides significant advantages. It minimizes network traffic in the computer network by providing an efficient data streaming method. In the preferred embodiment, known unicasting and multicasting techniques are selectively combined without direct end user involvement to maximize bandwidth. The invention has particular utility to provide efficient streaming of video data from a video server to end users in a computer network such as an enterprise intranet.

One of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "client" should be broadly construed to mean any computer or component thereof directly or indirectly connected or connectable in any known or later-developed manner to a computer network, such as the Internet. The term "server" should also be broadly construed to mean a computer, computer platform, an adjunct to a computer or platform, or any component thereof. Of course, a "client" should be broadly construed to mean one who requests or gets an object (such as a file), and the "server" is the entity which downloads or otherwise provides the object to a given client. The client-server paradigm, of course, is well-known.

Although the invention has been particularly shown and described with reference to a preferred embodiment, it will be understood by those skilled in the art that various changes in form and detail may be made therein without departing from the spirit and scope of the invention.

What is claimed is:

1. A method of transporting a data stream from a server to a client running on a network segment in a computer network having a plurality of segments, the method comprising the steps of:

(a) determining whether the network segment is available for transport of the data stream using a first protocol;

(b) if the network segment is not available for transport of the data stream using the first protocol, converting the data stream to a second protocol;

(c) re-transmitting the data stream to the client using the second protocol; and (d) receiving the data stream at the client.

2. The method as described in claim 1 wherein the first protocol is IP multicast and the second protocol is IP unicast.

3. The method as described in claim 1 wherein step (b) further includes the steps of:

issuing an IP unicast request from the client to the server; and having the server transmit the data stream via the second protocol.

4. The method as described in claim 1 wherein the server is a video server and the data stream is a video.

5. The method as described in claim 1 wherein the computer network is an intranet.

6. The method as described in claim 1 where the data stream is not available for transport to the network segment via the first protocol because the network segment does not support transmissions via the first protocol.

7. A method of streaming video data from a video server to a client running on a segment of an intranet, comprising the steps of:

(a) determining whether the video data can be transported to the segment via IP multicast;

(b) if the video data can not be transported to the segment via IP multicast, having the client issue a request to the server to transport the video data via IP unicast;

(c) having the server transport the video data to the segment via IP unicast;

(d) selectively re-broadcasting the video data over the segment via IP multicast; and (e) receiving and outputting the video data at the client.

8. The method as described in claim 7 wherein the video data is not available for transport over the segment via IP multicast because the segment does not support IP multicast.

9. The method as described in claim 7 wherein the video data is not available for transport over the segment via IP multicast because an IP multicast capability is not activated in the segment.

10. A computer program product for use to facilitate transport of a data stream from a server to a client running on a network segment in a computer network having a plurality of segments, comprising:

(a) code for determining whether the network segment is available for transport of the data stream using a first protocol;

(b) code for converting the data stream to a second protocol if the network segment is not available for transport of the data stream using the first protocol;

(c) code for re-transmitting the data stream to the client using the second protocol; and (d) code for receiving the data stream at the client.

11. A computer program product for use to facilitate streaming of video data from a video server to a client running on a segment of an intranet, comprising:

(a) code for determining whether the video data can be transported to the segment via IP multicast;

(b) code for issuing a request to the server from the client to transport the video data via IP unicast if the video data cannot be transported to the segment via IP multicast;

(c) code for transporting the video data from the server to the segment via IP unicast;

(d) code for selectively re-broadcasting the video data over the segment via IP multicast; and (e) code for receiving and outputting the video data at the client.

* * * * *